106. COMPOSITIONS, COATING OR PLASTIC

Patented May 1, 1934

1,956,779

UNITED STATES PATENT OFFICE 1,956,779

ASPHALT EMULSION

Joseph W. Sparks, Hammond, Ind., assignor to Standard Oil Company, Chicago, Ill., a corporation of Indiana No Drawing. Application December 24, 1930, Serial No. 504,635

1 Claim. (Cl. 134—1)

This invention relates to bituminous emulsions and it pertains more particularly to emulsions of petroleum asphalts.

The object of this invention is to provide, at a minimum cost, a fluid, aqueous asphalt emulsion which may be diluted with hard water without separating out.

A further object is to provide an emulsion which, when applied to a surface, will coalesce thereto and form a uniform hard layer of asphalt which cannot be readily dislodged therefrom or reemulsified by the application of water.

A further object is to provide an emulsion which has no tendency to form a scum or skin on its surface.

A further object is to provide an emulsion that is not adversely affected by freezing or by changes in temperature, that will flow in cold weather, and will not separate or "break" in either extremely cold or hot weather.

A further object is to provide an asphalt emulsion that can be used for the widely varying purposes which have heretofore required separate types of emulsions,—in other words, to provide an emulsion which may be used as a highway building material, paint, water proofing material, flooring material, protective coating material, etc.

I have discovered that mixtures of certain emulsifying agents with sodium silicate are remarkably effective in emulsifying asphalt. Sodium silicate has been used by itself and in combination with fatty acids, etc., but I have discovered that results of an entirely different order are accomplished when it is mixed with small amounts of green acid soap. A mixture of sodium silicate with trisodium phosphate is also unusually effective for this purpose. My invention will be more clearly understood from the following description of preferred embodiments. For example, I may use the following formula:

|   | Per cent by weight |
|---|---|
| Water | 32.00 |
| Asphalt | 65.61 |
| Water glass | 1.96 |
| Green acid soap | 0.43 |

The asphalt for use in this formula may be produced from Mid-Continent petroleum; it may have a melting point of about 110° F. and a penetration of about 130 at 77° F. My formula may be readily adapted to other asphalts, however, the proportions of emulsifying agents being slightly increased for asphalts of increased melting points.

Green acid soap is a composition of preferentially water soluble sulfonic salts. This soap may be prepared by the neutralization of green acids, which are well known in the petroleum industry and which are described in the United States patent to Humphreys et al. No. 1,474,933. Green acid soap is used in refineries for breaking emulsions and a "spent G. A. soap" which results from this use may also be employed in my invention. If the green acid soap contains appreciable amounts of oil, a harder asphalt should be emulsified, to produce a residue of given penetration, than is necessary when the green acid soap is free from oil. The term "green acid soap" as used herein includes concentrated soap, spent soap, soap containing oil and other forms in which this substance is available. In the formula the percent of green acid soap is on the dry soap basis.

The water glass in the above formula is a commercial grade, 40° Bé. solution. It is understood, of course, that I may use various concentrations of sodium silicate, and its alkalinity may vary within relatively wide limits.

In preparing the emulsion the procedure is as follows: G. A. soap and water glass are mixed with the water and heated to a temperature of about 180° F. This hot solution or mixture is placed in a suitable stirrer, agitator or mixer and it is beaten by paddles, circulated by centrifugal pumps or dispersed between suitable rotors moving at high velocities. The apparatus per se forms no part of my present invention and it will not be described in detail.

The melted asphalt at about the same temperature is slowly stirred into the solution and further agitated until complete emulsification has taken place. When high melting point asphalts are used it may be necessary to increase the temperature at which the asphalt is added, but it is desirable to keep the temperature of the emulsion below the boiling point of water so that the foaming due to the production of steam may be prevented.

Instead of green acid soap I may use the reaction product of trisodium phosphate and beta fat, the formula being substantially as follows:

|   | Per cent by weight |
|---|---|
| Water | 32.00 |
| Asphalt | 65.46 |
| Water glass | 1.98 |
| Trisodium phosphate | .28 |
| Beta fat | .28 |

In this case the emulsifier is mixed in the aqueous solution, heated, placed in the stirrer, and the melted asphalt is poured into the hot solution substantially as above described. I have found that when unneutralized fatty acid is used in these formulæ an emulsion of inferior quality is produced.

Emulsions prepared by either of the above formulæ are not broken by dilution with large volumes of hard water, they can be subjected to temperatures from below freezing to boiling without separation of the phases, and they are characterized by a uniform, smooth consistency.

An important feature of the invention is the decrease in cost which is accomplished by the particular formulæ proposed. The cost of the emulsifier in my formulæ is from one-fifth to one-fiftieth of the cost of emulsifiers heretofore used to obtain equivalent results. This marked decrease in the cost of production is of great importance, particularly when the cost of the emulsifying agent forms a considerable part of the cost of the finished emulsion.

In the above description I have described the emulsification of asphalt, but it is understood that the invention is applicable to equivalent bituminous materials. If hard high melting point bitumens are to be emulsified, the amount of emulsifying agent must be slightly increased and in some instances it may be double the amount specified in the above examples. The proportions, rates of stirring, etc. will also vary with the bitumen that is to be emulsified, as will be apparent to those skilled in the art.

While I have disclosed preferred embodiments of the invention it is understood that I do not limit myself to the details herein set forth except as defined by the following claim.

I claim:

A concentrated fluid aqueous asphalt emulsion which may be diluted with hard water without separating out, comprising about two parts of asphalt emulsified in one part of water by means of an emulsifier containing green acid soap in combination with a compound of the group which consists of sodium silicate and trisodium phosphate.

JOSEPH W. SPARKS.